(12) United States Patent
Toyoizumi et al.

(10) Patent No.: US 10,360,821 B2
(45) Date of Patent: Jul. 23, 2019

(54) SENTENCE RECOGNITION DEVICE, SENTENCE RECOGNITION METHOD, AND RECORDING MEDIUM

(71) Applicant: AT Communications Co., Ltd., Tokyo (JP)

(72) Inventors: Hiroshi Toyoizumi, Tokyo (JP); Youichi Azuma, Tokyo (JP); Tetsuya Takahashi, Tokyo (JP); Maya Takami, Tokyo (JP)

(73) Assignee: AT Communications Co., Ltd., Tokyo (JP)

( * ) Notice: Subject to any disclaimer, the term of this patent is extended or adjusted under 35 U.S.C. 154(b) by 69 days.

(21) Appl. No.: 15/115,627

(22) PCT Filed: Feb. 3, 2014

(86) PCT No.: PCT/JP2014/052463
§ 371 (c)(1),
(2) Date: Jul. 29, 2016

(87) PCT Pub. No.: WO2015/114835
PCT Pub. Date: Aug. 6, 2015

(65) Prior Publication Data
US 2017/0186342 A1    Jun. 29, 2017

(51) Int. Cl.
*G06F 7/76*         (2006.01)
*G09C 1/02*         (2006.01)
(Continued)

(52) U.S. Cl.
CPC ........... *G09C 1/02* (2013.01); *G06F 17/2217* (2013.01); *G06F 17/2765* (2013.01)

(58) Field of Classification Search
None
See application file for complete search history.

(56) References Cited

U.S. PATENT DOCUMENTS

| | | | |
|---|---|---|---|
| 2002/0131591 | A1 | 9/2002 | Henson et al. |
| 2011/0081077 | A1 | 4/2011 | Tani |
| 2013/0117576 | A1 | 5/2013 | Kataoka et al. |

FOREIGN PATENT DOCUMENTS

| | | |
|---|---|---|
| CN | 102033904 | 4/2011 |
| JP | 2000-148740 | 5/2000 |

(Continued)

OTHER PUBLICATIONS

CA2705839. Purella AG (Year: 2007).*

(Continued)

*Primary Examiner* — Venkat Perungavoor
(74) *Attorney, Agent, or Firm* — K&L Gates LLP; Louis C. Cullman; Hal Gibson (57) ABSTRACT

A character code conversion device (10) utilizes not a standard character code table but a conversion character code table that is the converted standard character code, and transmits a conversion character code string indicating a sentence subjected to transmission to a sentence recognition device (20) via a network (N). Hence, even if a third party obtains the conversion character code string, the standard character code table is utilized, and thus the character string specified from the conversion character code string is completely different from the sentence subjected to transmission. Accordingly, proper recognition of the sentence subjected to transmission is difficult. Consequently, the security of the sentence subjected to transmission is enhanced.

6 Claims, 6 Drawing Sheets

(51) Int. Cl.
*G06F 17/22* (2006.01)
*G06F 17/27* (2006.01)
*G06F 5/01* (2006.01)

(56) References Cited

FOREIGN PATENT DOCUMENTS

| | | |
|---|---|---|
| JP | 2002-64672 | 2/2002 |
| JP | 2003-157085 | 5/2003 |
| JP | 2005-141282 | 6/2005 |
| JP | 2007-065253 A | 3/2007 |
| JP | 2009-139722 | 6/2009 |
| JP | 2009-218800 | 9/2009 |
| JP | 2011-81030 | 4/2011 |
| JP | 2013-97332 | 5/2013 |
| JP | 2013-98869 | 5/2013 |
| WO | 199805142 A1 | 2/1998 |

OTHER PUBLICATIONS

CN 101996298. Hongfujin. (Year: 2011).*
CN 103825723. Shenzhen Taiwoo IOT Technology CO LTD (Year: 2014).*
KR 2002-0003914. EM Technology. (Year: 2002).*
Format-Preserving Encryption for Character Data. Li et al. Journal of Networks. (Year: 2012).*
Evaluating the Performance of Reverse Encryption Algorithm on the Databases. Mousa. (Year: 2013).*
TW 201411393. Nan Kai University of Technologytw (Year: 2014).*
EP 14880530.2 Feb. 8, 2017 Search Report.
Korean Office Action dated Jul. 20, 2017 with English translation; 7 pages.

* cited by examiner

00000→ans9ewjdses3aexa
00001→cmrfxqxqpasdkfq3rx
00002→mxjqwjfxaajrfcjwwrex
　　　·
　　　·
　　　·
65535→eiu37sgcvjw4y8

SENTENCE RECOGNITION DEVICE, SENTENCE RECOGNITION METHOD, AND RECORDING MEDIUM

TECHNICAL FIELD

The present disclosure relates to a sentence recognition device, a sentence recognition method, and a program, and more particularly, to a sentence recognition device, a sentence recognition method, and a program which have an excellent security.

BACKGROUND ART

Schemes of encrypting characters in order to ensure the confidentiality of a sentence have been known from old times (see, for example, Patent Literature 1). Note that the entire specification, claims, and drawings of Patent Literature 1 are herein incorporated in this specification by reference.

CITATION LIST

Patent Literature

Patent Literature 1: Unexamined Japanese Patent Application Kokai Publication No. 2002-064672

SUMMARY OF INVENTION

Technical Problem

Even if characters are encrypted, however, when character data that indicates a character by a numerical value is not encrypted, a third party is capable of easily identify the character, decreasing the security.

The present disclosure has been made in view of the aforementioned circumstances, and an objective is to provide a sentence recognition device, a sentence recognition method, and a program which have an excellent security.

Solution to Problem

In order to accomplish the above objective, a sentence recognition device according to a first aspect of the present disclosure includes a first character code table registering a character in association with a first character code indicating the character by a numerical value, and the device includes:

first generation means that generates, in response to an inputting of a second character code different from the first character code, a second character code table registering the character in association with the second character code from the first character code table; and sentence recognition means that detects, from the second character code table generated by the first generation means, the character corresponding to the input second character code, and recognizes a sentence formed by the character indicated by the input second character code.

In the above sentence recognition device,
the first generation means may include:
conversion character string generation means that converts each of the first character codes registered in the first character code table to generate a conversion character string corresponding to each of the characters; and first sequence changing means that changes a sequence in the conversion character string generated by the conversion character string generation means in accordance with a predetermined sequence, and the first generation means may allocate in sequence a numerical value to each of the characters corresponding to the conversion character string having undergone the sequence change by the first sequence changing means to generate the second character code table registering the character in association with the second character code.

In the above sentence recognition device, the conversion character string generation means may encrypt each of the first character codes registered in the first character code table to generate an encrypted character string corresponding to each of the characters.

The above sentence recognition device may further include second character code receiving means that receives the second character code transmitted from a character code conversion device including the first character code table via a network, in which the character code conversion device may include:

second generation means that generates, in response to an inputting of the sentence, the second character code table from the first character code table;

second character code extraction means that extracts, from the second character code table generated by the second generation means, the second character code corresponding to the character that forms the sentence; and second character code transmitting means that transmits, to the sentence recognition device, the second character code extracted by the second character code extraction means via the network.

In the above sentence recognition device,
the second generation means may include:
encrypted character string generation means that encrypts, in response to an inputting of the sentence, each of the first character codes registered in the first character code table using a predetermined encryption key to generate an encrypted character string corresponding to each of the characters; and second sequence changing means that changes a sequence in the encrypted character string generated by the encrypted character string generation means in accordance with a predetermined sequence, the second generation means may allocate in sequence a numerical value to each of the characters corresponding to the encrypted character string having undergone the sequence change by the second sequence changing means to generate the second character code table registering the character in association with the second character code, the second character code transmitting means may transmit, to the sentence recognition device, the predetermined encryption key and the second character code extracted by the second character code extraction means via the network, the second character code receiving means receives the predetermined encryption key and the second character code both transmitted from the second character code transmitting means via the network, and the conversion character string generation means may encrypt each of the first character code registered in the first character code table using the predetermined encryption key received by the second character code receiving means to generate an encrypted character string corresponding to each of the characters.

In order to accomplish the above objective, a sentence recognition method according to a second aspect of the present disclosure is executed by a sentence recognition device that includes a first character code table registering a character in association with a first character code indicating the character by a numerical value, and the method include:

a first generation step of generating, in response to an inputting of a second character code different from the first character code, a second character code table registering the character in association with the second character code from the first character code table; and a sentence recognition step of detecting, from the second character code table generated in the first generation step, the character corresponding to the input second character code, and of recognizing a sentence formed by the character indicated by the input second character code.

In order to accomplish the above objective, a program according to a third aspect of the present disclosure causes a computer serving as a sentence recognition device that includes a first character code table registering a character in association with a first character code indicating the character by a numerical value, and the program causes the computer to execute:

a first generation procedure of generating, in response to an inputting of a second character code different from the first character code, a second character code table registering the character in association with the second character code from the first character code table; and a sentence recognition procedure of detecting, from the second character code table generated in the first generation procedure, the character corresponding to the input second character code, and of recognizing a sentence formed by the character indicated by the input second character code.

Advantageous Effects of Invention

According to the present disclosure, a sentence recognition device, a sentence recognition method, and a program which have an excellent security are provided.

DESCRIPTION OF EMBODIMENTS

Embodiments to carry out the present disclosure will be explained below.

First, an explanation will be given of a configuration of a sentence processing system according to an embodiment with reference to the figures.

Figure 1:
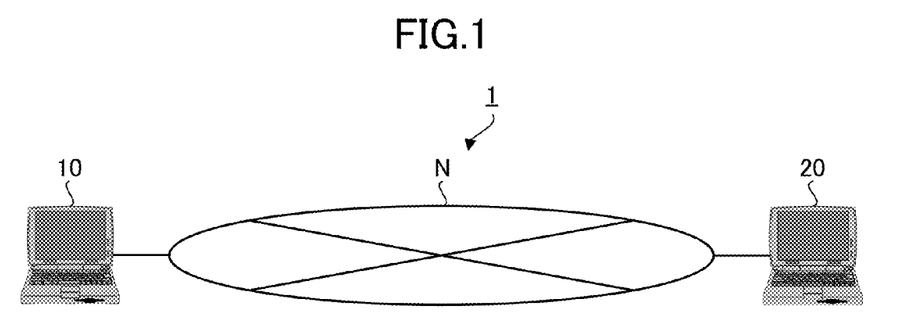
FIG. 1 is a configuration diagram illustrating an example sentence processing system.

As illustrated in FIG. 1, a sentence processing system 1 includes a character code conversion device 10, and a sentence recognition device 20. Those are connected together via a network N like the Internet in a mutually communicable manner.

Figure 2:
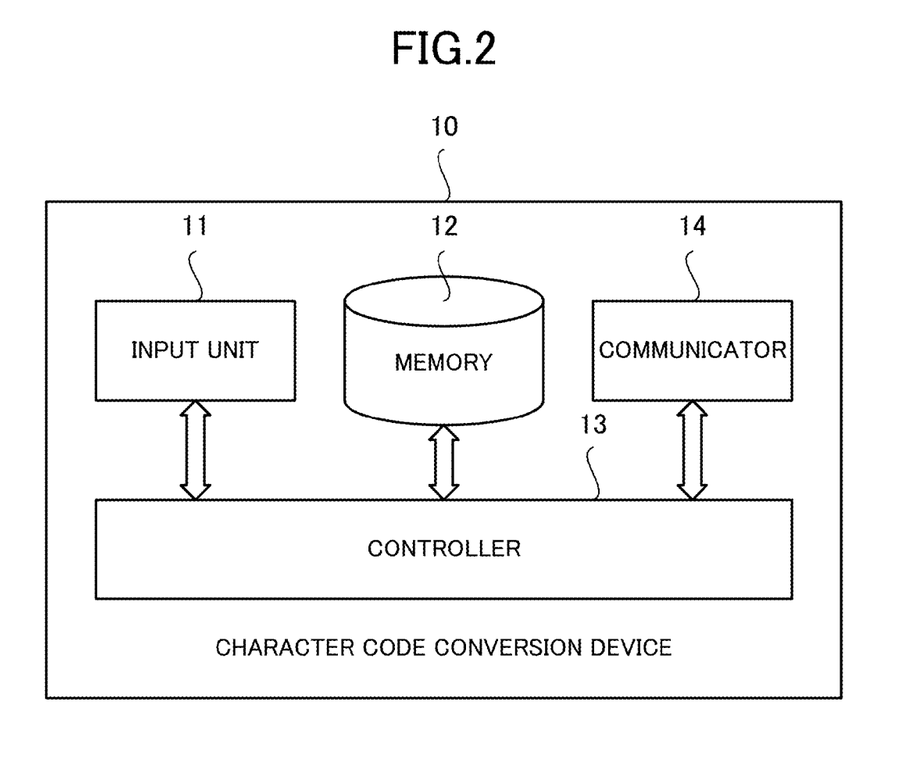
FIG. 2 is a block diagram illustrating an example configuration of a character code conversion device.

FIG. 2 is a block diagram illustrating an example configuration of the character code conversion device.

The character code conversion device 10 is, for example, a general-purpose computer, and includes, as illustrated in FIG. 2, an input unit 11, a memory 12, a controller 13, and a communicator 14.

The input unit 11 includes, for example, a keyboard and a mouse, and inputs a predetermined sentence in accordance with a user operation.

The memory 12 includes, for example, a hard disk drive, and stores standardized character code table like a JIS standard character code table.

In this case, the standard character code is a byte expression allocated to each character in order to utilize the character over a computer. In addition, the JIS standard character code is a two-byte-based character code, is sometimes called a "double-type character", and allocates numbers "00000" to "65535" (decimal number) to each character including alphabet, number, KANJI, HIRAGANA, and KATAKANA. Note that a "character" according to the present disclosure means all characters including alphabet, number, KANJI, HIRAGANA, KATAKANA, and symbol.

Note that the standard character code table may be an American Standard Code for information Interchange (ASCII) code table. The ASCII code is a one-byte-based character code, is sometimes called a "half-size character", and allocates numbers "000" to "127" (decimal number) to each character including alphabet, number, and the like.

The controller 13 includes, for example, a Central Processing Unit (CPU), a Read Only Memory (ROM), and a Random Access Memory (RAM), and controls various actions of the character code conversion device 10 by the CPU which utilizes the RAM as a work memory and which executes a program stored in the ROM or the memory 12 as appropriate.

In this embodiment, the controller 13 generates a conversion character code table from the stored standard character code table in the memory 12.

More specifically, the controller 13 performs a predetermined encryption process on the standard character code allocated to each character in the standard character code table, thereby generating the encrypted character string corresponding to respective characters. In this embodiment, the standard character code allocated to each character is encrypted in a Rijndael encryption scheme using a predetermined encryption key, thereby generating the encrypted character string corresponding to respective characters.

In this case, the encryption key may be stored in the ROM or the memory 12 beforehand, or may be generated using a predetermined random number every time a sentence is input through the input unit 11 or the like. Alternatively, the encryption key may be set up by the user. In addition, the encryption scheme is not limited to the Rijndael scheme, and other encryption schemes are applicable. For example, Elliptic Curve Cryptography (ECC) encryption, and asymmetric encryption (open key encryption), such as Rivest-Shamir-Adleman (RSA) encryption and ElGamal encryption, are suitably applicable to the present disclosure. In addition, Advanced Encryption Standard (AES) encryption and Data Encryption Standard (DES) encryption, and the like, are also applicable to the present disclosure. Alternatively, the standard character code may be converted by a scheme other than encryption, for example, a predetermined algorithm.

Figure 3:
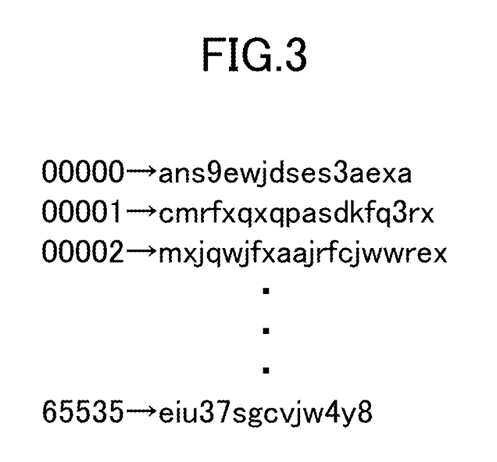
FIG. 3 is an explanatory diagram illustrating an example character code.

As an example, as illustrated in FIG. 3, the standard character code "0000" is encrypted in the Rijndael encryption scheme using an encryption key "R28djaowis912jaas0slwodkqod3m010", and an encrypted character string "ans9ewjdses3aexa" is generated. In addition, encrypted character strings "cmrfxqxqpasdkfq3rx", "mxjqwjfxagjrfcjwwrex", "and "eiu37sgcvjw4y8", and the like, are respectively generated from standard character codes "00001", "00002", and "65535", and the like.

Next, the controller 13 illustrated in FIG. 2 changes the sequence in the generated encrypted character string into an alphabetical sequence, thereby changing the sequence of each character corresponding to the encrypted character string. In the example case illustrated in FIG. 3, the sequence is changed as the encrypted character strings "ans9ewjdses3aexa", "cmrfxqxqpasdkfq3rx", "eiu37sgcvjw4y8", and "mxjqwjfxaajrfcjwwrex", generated from the standard character codes "00000", "00001", "65535", and "00002", respectively. The sequence in encrypted character string may be changed arbitrarily, and may be defined by the user or the like beforehand, or may be generated in accordance with, for example, a predetermined algorithm using an encryption key.

Next, the controller 13 illustrated in FIG. 2 re-allocates the numbers "00000" to "65535" (decimal number) in sequence to the respective characters in the encrypted character string that have respective sequences changed in accordance with the alphabetical sequence to obtain respective conversion character codes, thereby generating the conversion character code table.

Subsequently, the controller 13 extracts, from the generated conversion character code table, the conversion character code corresponding to each character that forms a sentence input through the input unit 11, and generates a conversion character code string including the extracted conversion character codes.

The communicator 14 includes, for example, a Network Interface Card (NIC), and transmits the encryption key utilized by the controller 13 and the generated conversion character code string to the sentence recognition device 20 via the network N.

Figure 4:
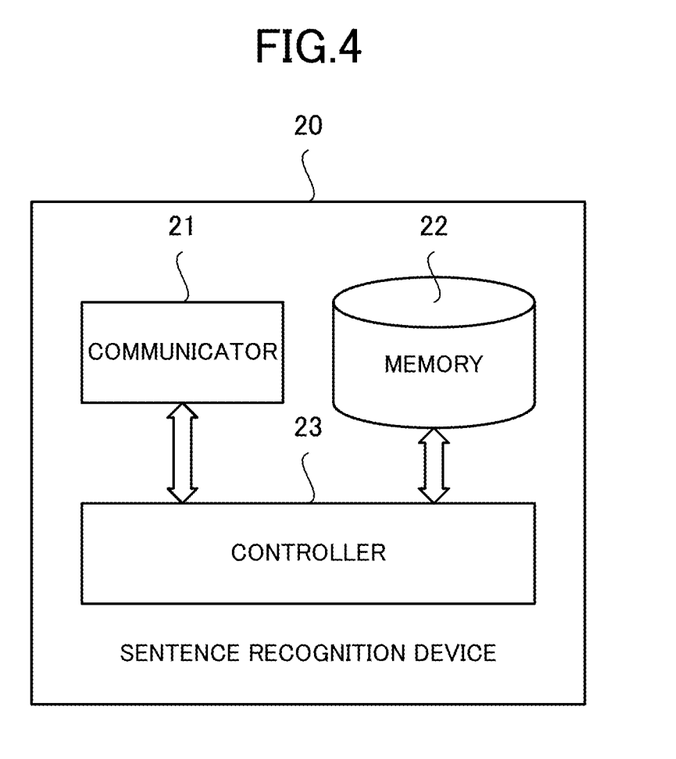
FIG. 4 is a block diagram illustrating an example configuration of a sentence recognition device.

FIG. 4 is a block diagram illustrating an example configuration of the sentence recognition device.

The sentence recognition device 20 is, for example, a general-purpose computer, and as illustrated in FIG. 4, includes a communicator 21, a memory 22, and a controller 23.

The communicator 21 includes, for example, an NIC, and receives the conversion character code string and the encryption key both transmitted from the character code conversion device 10 via the network N.

The memory 22 includes, for example, a hard disk drive, and stores the standard character code table coincide with the stored standard character code table in the memory 12.

The controller 23 includes, for example, a CPU, a ROM, and a RAM, and controls various actions of the sentence recognition device 20 by the CPU which utilizes the RAM as a work memory and which executes a program stored in the ROM or the memory 22 as appropriate.

In this embodiment, the controller 23 generates the conversion character code table coincide with the generated conversion character code table by the character code conversion device 10 based on the received encryption key by the communicator 21, and the stored standard character code table in the memory 22.

More specifically, the controller 23 performs a predetermined encryption process on the standard character code allocated to each character in the standard character code table. In this embodiment, the standard character code allocated to each character is encrypted in the Rijndael encryption scheme using the received encryption key by the communicator 21, thereby generating the encrypted character string corresponding to respective characters.

Next, the controller 23 changes the sequence in the generated encrypted character string into the alphabetical sequence, thereby changing the sequence of each character corresponding to the encrypted character string.

Subsequently, the controller 23 re-allocates the numbers "00000" to "65535" (decimal number) in sequence to the respective characters in the encrypted character string which have respective sequences changed in accordance with the alphabetical sequence to obtain the conversion character code, thereby generating the conversion character code table.

Next, the controller 23 specifies the input sentence by the user from the received conversion character code string by the communicator 21 using the generated conversion character code table.

More specifically, the controller 23 detects a character corresponding to each conversion character code that forms the conversion character code string from the generated conversion character code table, and recognizes the sentence formed by the detected characters as the input sentence by the user.

Next, an explanation will be given of an action of the sentence processing system 1 employing the above configuration with reference to the figures.

Figure 5:
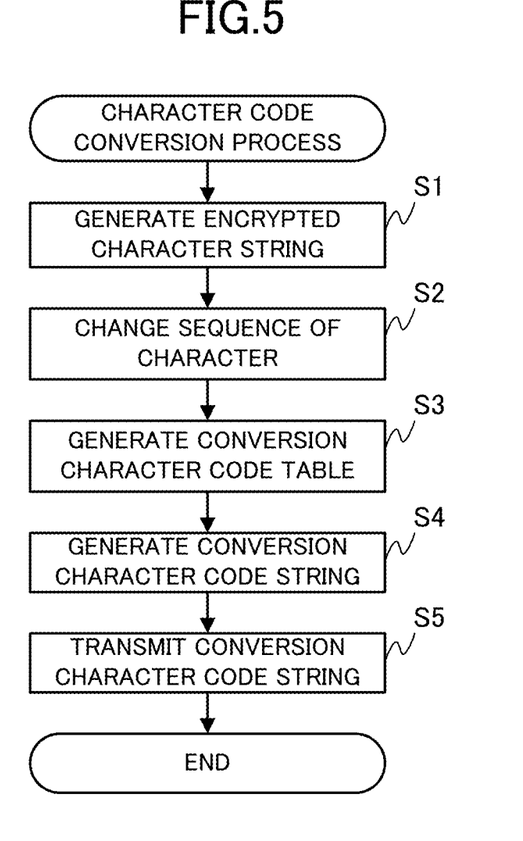
FIG. 5 is a flowchart illustrating an example character code conversion process.

When the user inputs a sentence through the input unit 11 of the character code conversion device 10, the character code conversion device 10 starts a character code conversion process illustrated in FIG. 5.

In a character code encryption process illustrated in FIG. 5, first, the controller 13 encrypts the standard character code allocated to each character in the standard character code table in the Rijndael encryption scheme using the predetermined encryption key, thereby generating the encrypted character string corresponding to respective characters (step S1).

Next, the controller 13 changes the sequence in the encrypted character string generated in the step S1 in the alphabetical sequence, thereby changing the sequence of each character corresponding to the encrypted character (step S2).

Subsequently, the controller 13 re-allocates the numbers "00000" to "65535" (decimal number) in sequence to the respective characters in the encrypted character sting that have respective sequences changed in accordance with the alphabetical sequence to obtain the conversion character code, thereby generating the conversion character code table (step S3).

In addition, the controller 13 extracts, from the conversion character code table generated in the step S3, the conversion character code corresponding to each character that forms the sentence input through the input unit 11, and generates the conversion character code string formed by the extracted conversion character codes (step S4).

Next, the controller 13 transmits the encryption key utilized in the step Si and the conversion character code string generated in the step S4 to the sentence recognition device 20 from the communicator 14 via the network N (step S5).

Figure 6:
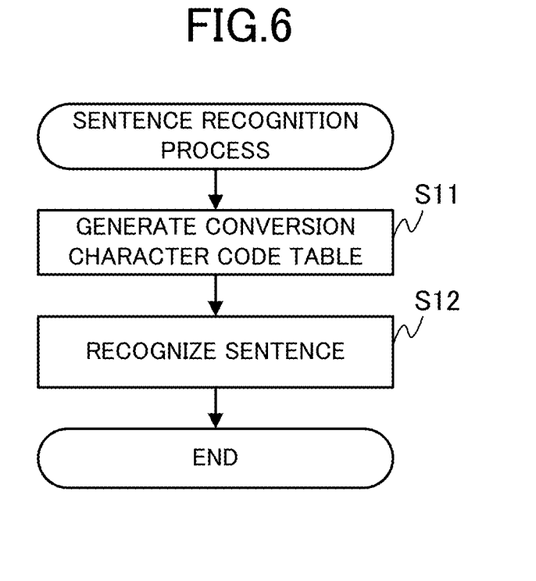
FIG. 6 is a flowchart illustrating an example sentence recognition process.

When the communicator 21 receives the transmitted conversion character code string from the character code conversion device 10 via the network N, the sentence recognition device 20 starts a sentence recognition process illustrated in FIG. 6.

In a character code decryption process illustrated in FIG. 6, first, the controller 23 generates the conversion character code table coincide with the conversion character code table generated by the character code conversion device 10 based on the received encryption key by the communicator 21, and the stored standard character code table in the memory 22 (step S11).

Next, the controller 23 detects, from the conversion character code table generated in the step S11, the character corresponding to each conversion character code that forms the conversion character code string, and recognizes the sentence formed by the detected characters as the input sentence by the user (step S12).

As explained above, according to the sentence processing system 1 of this embodiment, the character code conversion device 10 utilizes not the standard character code table but the conversion character code table that is the converted standard character code table, and transmits the conversion character code string indicating the sentence subjected to the transmission to the sentence recognition device 20 via the network N. Hence, even if a third party obtains the conversion character code string, the standard character code table is utilized in this case, and thus the character string specified from the conversion character code string is completely different from the sentence subjected to the transmission. Accordingly, proper recognition of the sentence subjected to the transmission is difficult. Consequently, the security of the sentence subjected to the transmission is enhanced.

In addition, the sentence recognition device 20 generates the conversion character code table through the same scheme as that of the character code conversion device 10, and thus the conversion character code table coincide with that of the character code conversion device 10 can be generated when the encryption key used by the character code conversion device 10 is known. In contrast, even if a third party gets the encryption key, when the generation scheme of the standard character code table is unknown, the coincide conversion character code table cannot be generated. Hence, the security of the sentence subjected to the transmission is further enhanced.

Note that the present disclosure is not limited to the above embodiment, and various changes and modifications can be made. Modified examples of the above embodiment applicable to the present disclosure will be explained below.

In the above embodiment, the explanation has been given of a case in which the encryption key is transmitted from the character code conversion device 10 to the sentence recognition device 20. However, the present disclosure is not limited to this case, and the common encryption key may be prepared beforehand for both the character code conversion device 10 and the sentence recognition device 20. In addition, the encryption key may be uploaded beforehand to a server computer connected to both the character code conversion device 10 and the sentence recognition device 20 via the network N. Still further, the encryption key may be downloaded from the server computer when in use.

In the above embodiment, the explanation has been given of a case in which the conversion character code string is received by the communicator 21, thereby being input to the sentence recognition device 20. However, the present disclosure is not limited to this case, and the conversion character code string stored in a non-transitory recording medium may be read, thereby being input to the sentence recognition device 20, and how to input the conversion character code string can be changed as appropriate.

In the above embodiment, the respective programs executed by the CPUs of the controllers 13, 23 are stored in the respective ROMs or the like beforehand. However, the present disclosure is not limited to this case, and a program for executing the above processes may be applied to existing general-purpose computer, framework, workstation, or the like to accomplish the functions of the character code conversion device 10 and sentence recognition device 20 according to this embodiment.

How to provide such a program is optional, and for example, the program may be distributed in a manner stored in a non-transitory computer-readable recording medium (flexible disk, Compact Disc (CD)-ROM, Digital Versatile Disc (DVD)-ROM or the like), or the program may be stored in a storage over a network like the Internet, and may be downloaded and provided.

In addition, when the above process is shared by an Operating System (OS) and an application program, or is realized by the cooperative work of the OS and the application program, only the application program may be stored in a non-transitory recording medium or a storage. In addition, the program may be distributed via a network in a manner superimposed on carrier waves. For example, the above program may be posted in a Bulletin Board System (BBS) over the network, and may be distributed via the network. In addition, this program may be launched, and executed likewise the other application programs under the control of the OS to accomplish a configuration that executes the above processes.

The foregoing describes some example embodiments for explanatory purposes. Although the foregoing discussion has presented specific embodiments, persons skilled in the art will recognize that changes may be made in form and detail without departing from the broader spirit and scope of the invention.

REFERENCE SIGNS LIST

1 Sentence processing system
10 Character code conversion device
11 Input unit
12 Memory
13 Controller
14 Communicator
20 Sentence recognition device
21 Communicator
22 Memory
23 Controller

The invention claimed is:

1. A sentence recognition device that includes a processor and a memory that stores a first character code table registering a character in association with a first character code indicating the character by a numerical value, wherein the processor comprises:
   a first generator that generates, in response to an inputting of a second character code different from the first character code, a second character code table registering the character in association with the second character code from the first character code table; and
   a sentence recognizer that detects, from the second character code table generated by the first generator, the character corresponding to the input second character code, and recognizes a sentence formed by the character indicated by the input second character code, wherein
   the first generator comprises:
      a conversion character string generator that converts each of the first character codes registered in the first character code table to generate a conversion character string corresponding to each of the characters; and
      a first sequence changer that changes a sequence in the conversion character string generated by the conversion character string generator in accordance with a predetermined sequence, and the first generator allocates in sequence a numerical value to each of the characters corresponding to the conversion character string having undergone the sequence change by the first sequence changer to generate the second character code table registering the character in association with the second character code.

2. The sentence recognition device according to claim 1, wherein the conversion character string generator encrypts each of the first character codes registered in the first character code table to generate an encrypted character string corresponding to each of the characters.

3. The sentence recognition device according to claim 2, further comprising second character code receiver that receives the second character code transmitted from a character code conversion device including the first character code table via a network, wherein the character code conversion device comprises:

a second generator that generates, in response to an inputting of the sentence, the second character code table from the first character code table;

a second character code extractor that extracts, from the second character code table generated by the second generator, the second character code corresponding to the character that forms the sentence; and a second character code transmitter that transmits, to the sentence recognition device, the second character code extracted by the second character code extractor via the network.

4. The sentence recognition device according to claim 3, wherein:

the second generator comprises:

an encrypted character string generator that encrypts, in response to an inputting of the sentence, each of the first character codes registered in the first character code table using a predetermined encryption key to generate an encrypted character string corresponding to each of the characters; and a second sequence changer that changes a sequence in the encrypted character string generated by the encrypted character string generator in accordance with a predetermined sequence, the second generator allocates in sequence a numerical value to each of the characters corresponding to the encrypted character string having undergone the sequence change by the second sequence changer to generate the second character code table registering the character in association with the second character code, the second character code transmitter transmits, to the sentence recognition device, the predetermined encryption key and the second character code extracted by the second character code extractor via the network, the second character code receiver receives the predetermined encryption key and the second character code both transmitted from the second character code transmitter via the network, and the conversion character string generator encrypts each of the first character code registered in the first character code table using the predetermined encryption key received by the second character code receiver to generate an encrypted character string corresponding to each of the characters.

5. A sentence recognition method by a sentence recognition device that includes a processor and a memory that stores a first character code table registering a character in association with a first character code indicating the character by a numerical value, wherein the processor comprises:

a first generation step of generating, in response to an inputting of a second character code different from the first character code, a second character code table registering the character in association with the second character code from the first character code table; and a sentence recognition step of detecting, from the second character code table generated in the first generation step, the character corresponding to the input second character code, and of recognizing a sentence formed by the character indicated by the input second character code, wherein the first generation step comprises:

a conversion character string generation step of converting each of the first character codes registered in the first character code table, and of generating a conversion character string corresponding to each of the characters; and a first sequence changing step of changing a sequence in the conversion character string generated in the conversion character string generation step in accordance with a predetermined sequence, and the first generation step includes allocating in sequence a numerical value to each of the characters corresponding to the conversion character string having undergone the sequence change in the first sequence changing step to generate the second character code table registering the character in association with the second character code.

6. A non-transitory computer-readable recording medium storing a program causing a computer serving as a sentence recognition device that includes a processor and a memory that stores a first character code table registering a character in association with a first character code indicating the character by a numerical value, wherein the processor causes the computer to execute:

a first generation procedure of generating, in response to an inputting of a second character code different from the first character code, a second character code table registering the character in association with the second character code from the first character code table; and a sentence recognition procedure of detecting, from the second character code table generated in the first generation procedure, the character corresponding to the input second character code, and of recognizing a sentence formed by the character indicated by the input second character code, wherein a first generation procedure comprises:

a conversion character string generation procedure of converting each of the first character codes registered in the first character code table to generate a conversion character string corresponding to each of the characters; and a first sequence changing procedure of changing a sequence in the conversion character string generated in the conversion character string generation procedure in accordance with a predetermined sequence, and the first generation procedure includes allocating in sequence a numerical value to each of the characters corresponding to the conversion character string having undergone the sequence change in the first sequence changing procedure to generate the second character code table registering the character in association with the second character code.

* * * * *